(12) United States Patent
Cheng

(10) Patent No.: US 7,931,718 B2
(45) Date of Patent: Apr. 26, 2011

(54) OIL MIST SEPARATOR

(75) Inventor: Mao-Nan Cheng, Fongyuan (TW)

(73) Assignee: San Ford Machinery Co., Ltd., Taichung County (TW)

(*) Notice: Subject to any disclaimer, the term of this patent is extended or adjusted under 35 U.S.C. 154(b) by 134 days.

(21) Appl. No.: 12/421,155

(22) Filed: Apr. 9, 2009

(65) Prior Publication Data

US 2010/0258008 A1    Oct. 14, 2010

(51) Int. Cl.
*B01D 45/12* (2006.01)

(52) U.S. Cl. ............... 55/346; 55/345; 55/349; 55/428; 55/356; 55/457; 55/502; 55/423; 55/473; 55/DIG. 46; 96/417; 96/423; 95/24

(58) Field of Classification Search .......... 55/346–349, 55/345, 428, 356, 457, 502, 423, 473, DIG. 46; 96/417, 423; 95/24
See application file for complete search history.

(56) References Cited

U.S. PATENT DOCUMENTS

| | | | | |
|---|---|---|---|---|
| 1,997,125 A * | 4/1935 | Soyez et al. | ........... | 209/710 |
| 2,360,355 A * | 10/1944 | McBride et al. | ........... | 209/712 |
| 2,667,944 A * | 2/1954 | Crites | ........... | 55/422 |
| 2,765,918 A * | 10/1956 | Fontein et al. | ........... | 210/512.2 |
| 2,799,355 A * | 7/1957 | Easton | ........... | 55/286 |
| 2,887,177 A * | 5/1959 | Mund et al. | ........... | 55/321 |
| 2,889,008 A * | 6/1959 | Copp et al. | ........... | 55/348 |
| 3,000,036 A * | 9/1961 | De Benedetti | ........... | 15/314 |
| 3,061,994 A * | 11/1962 | Mylting | ........... | 55/346 |
| 3,074,218 A * | 1/1963 | O'Dell et al. | ........... | 55/343 |
| 3,074,219 A * | 1/1963 | Phyl et al. | ........... | 55/348 |
| 3,086,343 A * | 4/1963 | Stern | ........... | 55/456 |
| 3,104,961 A * | 9/1963 | Westlin | ........... | 96/307 |
| 3,147,099 A * | 9/1964 | Burdock et al. | ........... | 55/344 |
| 3,394,531 A * | 7/1968 | Andersen | ........... | 55/300 |
| 3,409,131 A * | 11/1968 | Petersen et al. | ........... | 209/143 |
| 3,425,192 A * | 2/1969 | Davis | ........... | 55/345 |
| 3,915,679 A * | 10/1975 | Roach et al. | ........... | 55/347 |
| 3,946,650 A * | 3/1976 | Culpepper, Jr. | ........... | 126/299 D |
| 4,162,906 A * | 7/1979 | Sullivan et al. | ........... | 55/346 |
| 4,407,663 A * | 10/1983 | Hawley | ........... | 55/347 |
| 4,504,292 A * | 3/1985 | Vohringer | ........... | 55/325 |
| 4,650,584 A * | 3/1987 | Macierewicz | ........... | 210/512.2 |
| 4,746,340 A * | 5/1988 | Durre et al. | ........... | 55/347 |
| 5,256,201 A * | 10/1993 | Gelain et al. | ........... | 118/326 |
| 6,080,217 A * | 6/2000 | Gobl et al. | ........... | 55/283 |
| 6,432,173 B1 * | 8/2002 | Johnson et al. | ........... | 95/269 |
| 6,884,273 B2 * | 4/2005 | Kopec et al. | ........... | 55/346 |
| 6,942,709 B2 * | 9/2005 | Trautmann et al. | ........... | 55/346 |
| 7,488,373 B2 * | 2/2009 | Haland et al. | ........... | 95/268 |
| 2004/0197622 A1 * | 10/2004 | Wheat et al. | ........... | 429/22 |
| 2006/0130445 A1 * | 6/2006 | Park et al. | ........... | 55/346 |

* cited by examiner

*Primary Examiner* — Jason M Greene
*Assistant Examiner* — Dung Bui
(74) *Attorney, Agent, or Firm* — Ming Chow; Sinorica, LLC

(57) ABSTRACT

An oil mist separator includes a body inside which a filtering chamber is formed for a filtering unit made up with several centrifugal dust collectors. With an air intake unit, the outside oil mist is sent into the filtering chamber. Then, the centrifugal dust collectors are used to cause a spiral airstream. With a centrifugal force caused by the spiral airstream, the oil mist is made to separate from the air. Next, the filtered air of zero pollution is vented to the atmosphere, and the separated oil mist is collected and recycled. Thus, the oil mist may be separated and the recycled oil mist may be made into a low-level oil product or a release agent used in the building industry for achievement of the effect of environmental protection.

5 Claims, 6 Drawing Sheets

OIL MIST SEPARATOR

BACKGROUND OF THE INVENTION

1. Field of the Invention

This invention relates to an oil mist separator.

2. Description of the Prior Art

Generally, a medium or large catering industry frequently causes much lampblack during operation, and a factory also frequently causes much oil mist during operation when using cutting oil or cooling oil. In order to avoid the lampblack and oil mist from causing turbid air indoors and then affecting an operator's mood and even endangering a human body, a kitchen ventilator is installed in the environment to extract the lampblack and oil mist.

However, the way of using the kitchen ventilator to directly extract the lampblack and oil mist to the outdoors will do serious harm to the environment. Although there is filter net installed on an exhaust passage in reaching the effect of filtering, the effect is limited. When being used for a period of time, the filter net is blocked and must be replaced, and especially when being used in a work environment where the oil mist is caused, the filter net is even replaced frequently, which puts the working personnel to annoyance. Further, the replaced filter net that is stained with greasy dirt has to be thrown away, which indirectly pollutes the environment and does not meet the requirement of environmental protection. Thus, it is really necessary to provide a means of effectively filtering the oil mist without using the filter net, and then collecting the extracted oil mist.

Consequently, because of the technical defects of described above, the applicant keeps on carving unflaggingly through wholehearted experience and research to develop the present invention, which can effectively improve the defects described above.

SUMMARY OF THE INVENTION

An oil mist separator according to this invention mainly comprises a body inside which a container is formed. A first spacer and a second spacer are formed in an inner layer of the container to form an exhaust chamber, a filtering chamber, and an oil collection chamber from top to bottom in the container. Further, through an air intake unit serving as an air blower, the oil mist is directly transmitted to the filtering chamber. Next, through a filtering unit, the oil mist is separated. The filtering unit is made up with several centrifugal dust collectors. Each of the centrifugal dust collectors is mainly provided with a hollow duct. One end of the duct is forwards convergent and formed into a convergent portion of which the end is formed with a mouth, while the other end of the duct is covered with a lid. A hollow nozzle going axially along the duct is provided passing through the lid. The two ends of nozzle are respectively formed into a guidance inlet and a guidance outlet. The guidance inlet lies in the convergent portion. Besides, one side of the body is formed with a prolonged portion parallel with its axis. A flowing passage communicating with the duct is formed in the prolonged portion, and a flowing port is formed at a free end of the prolonged portion. Further, the mouth of centrifugal dust collector passes through the first spacer. A guidance outlet of the centrifugal dust collector passes through the second spacer. Thus, the oil mist sent into the air intake unit may enter the duct from the flowing port and go spirally forward to the mouth along the inner wall of duct to form a spiral air stream, and with a centrifugal force caused by the spiral air stream, the oil mist of which the mass is heavier than the air is made to separate from the air and enters the oil collection chamber of the body from the mouth for collection and recovery. Then, the air of zero pollution that separates from the oil mist enters the exhaust chamber from the nozzle and, after being gathered in the exhaust chamber, is extracted to the outdoors. Thus, no filter net is required and the oil mist may even separate from the air, which protects the environment, and the oil mist separator is designed with modularity, so it is easy to assemble and repair. Further, the volume of oil mist separator is low and its profile is simple and of fashion; it is not abrupt even if the separator is used in a system kitchen. Next, the recycled oil mist may be made into a low-level oil product or a release agent used in the building industry for achievement of the effect of recycling.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
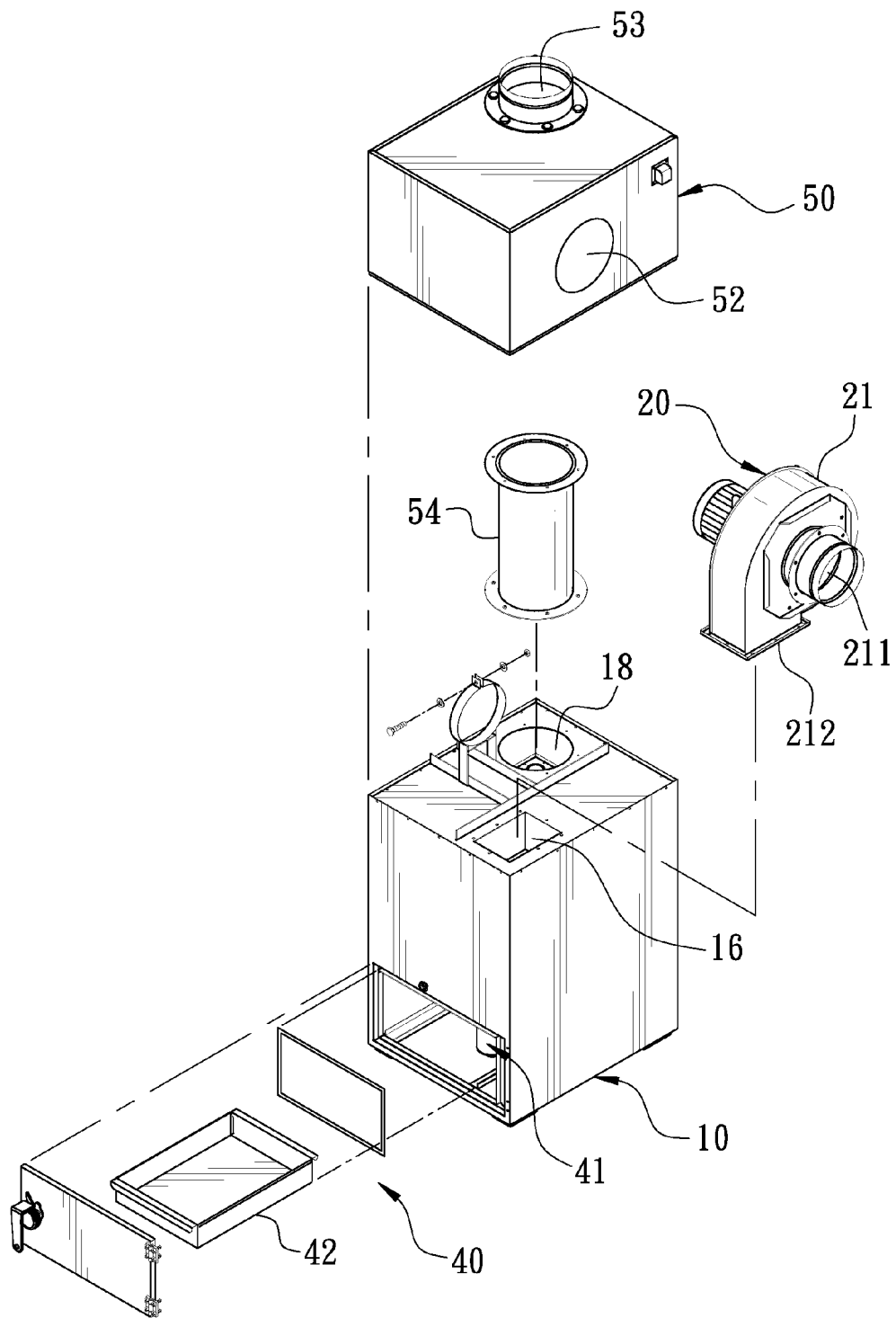
FIG. 1 is a 3D exploded view of an oil mist separator according to this invention.
Figure 2:
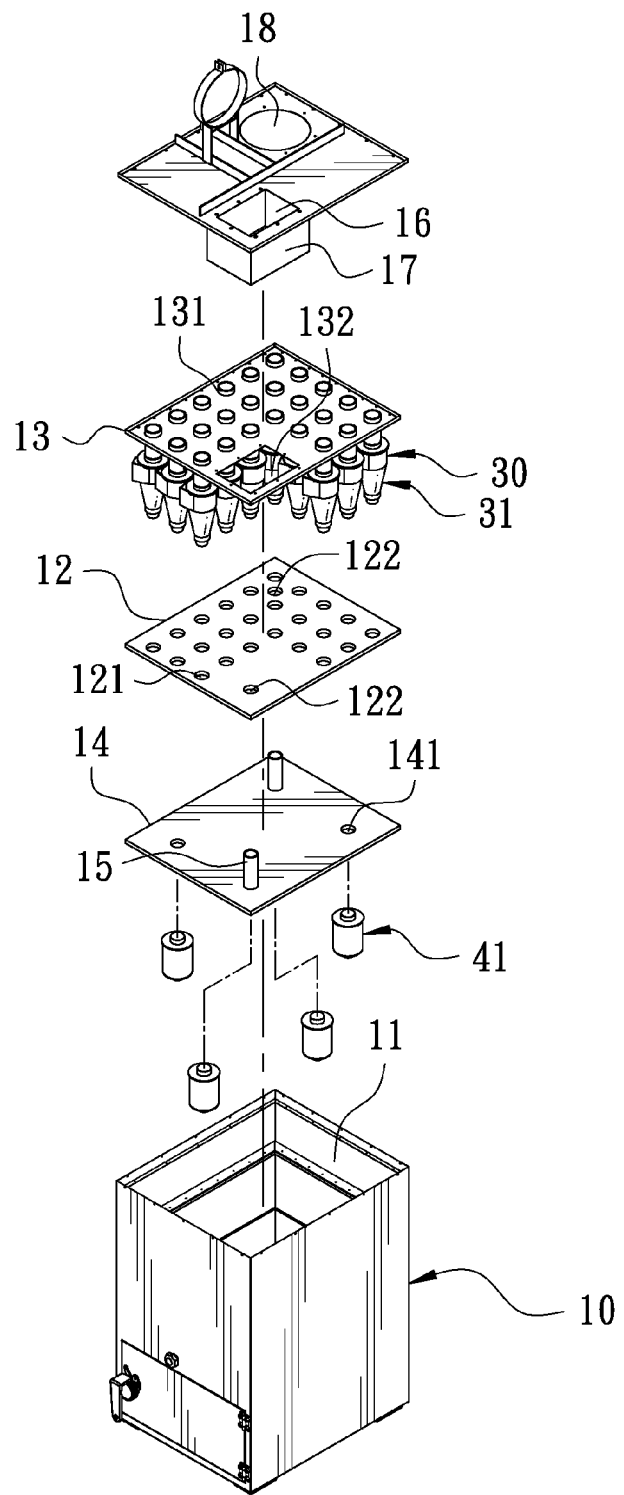
FIG. 2 is a 3D exploded view of the oil mist separator according to this invention.
Figure 3:
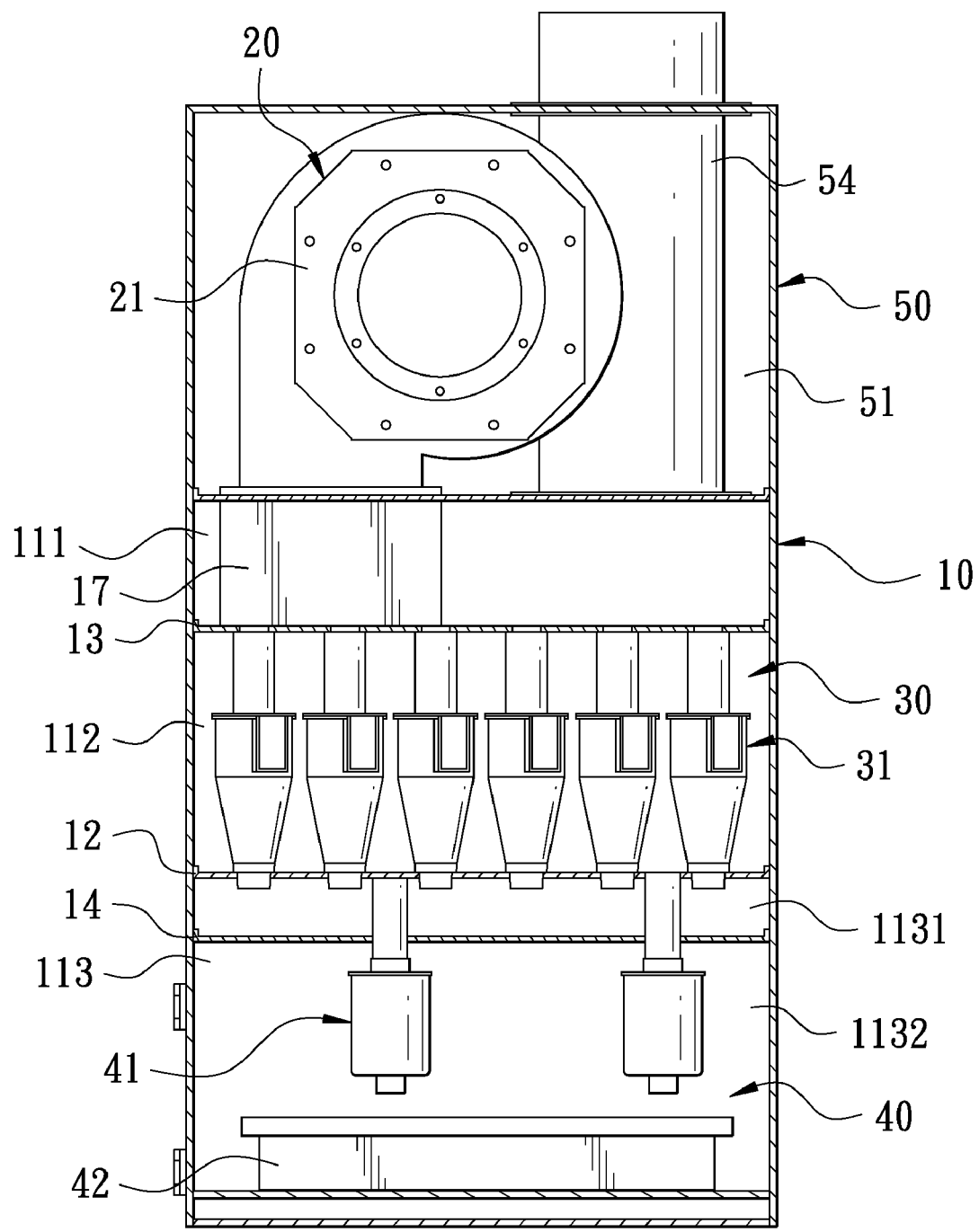
FIG. 3 is a sectional view of the oil mist separator according to this invention.

With reference to FIGS. 1 and 2 and with cross reference to FIG. 3 shown respectively as a 3D exploded view of an oil mist separator according to this invention, a 3D exploded view of the body, and a sectional view of the body, the oil mist separator mainly comprises a body 10, an air intake unit 20, a filtering unit 30, and an oil collection unit 40.

A container 11 is formed in the body 10, and a first spacer 12 and a second spacer 13 are formed and pile in an inner layer of the container 11 to form an exhaust chamber 111, a filtering chamber 112, and an oil collection chamber 113 from top to bottom in the container 11, as shown in FIG. 3. In the oil collection chamber 113, a third spacer 14 is even formed, and compartments of a separation layer 1131 and an oil collection layer 1132 are thereby formed. Further, several thru holes 121 are formed passing through the surface of first spacer 12. Second thru holes 131 of which the amount is equivalent to that of first thru holes 121 are symmetrical to the first thru holes 121 and pass through the surface of second spacer 13. Further, four third thru holes 141 parallel with each other are formed passing through the third spacer 14, in which each of two third thru holes 141 diagonally opposite to each other is connected to a hollow adapter 15. A free end of each of the adapters 15 is connected to a fourth thru hole 122 of the first spacer 12. Then, a housing 50 covers the top side of exhaust chamber of the body 10, and a container chamber 51 is thereby formed, as shown in FIG. 3, where the air intake unit 20 serving as an air blower 21 provided with an air inlet 211 and an air outlet 212 is contained. Next, a thru hole 52 is formed on the housing 50 and is connected to the air inlet 211 of air blower 21. A second thru hole 16 communicating with the exhaust chamber 111 is formed passing through the outside of body 10, a third thru hole 132 is formed on the second spacer 13, and a first hollow air duct 17 is used to connect the second thru hole 16 and the third thru hole 132. An air outlet 212 of the air blower 21 is connected to the second thru hole 16. Thus, the oil mist sucked into the air blower 21 is made to directly enter the filtering chamber 112. Further, a first via 18 communicating with the exhaust chamber 111 is formed passing through the outside of body 10. A second via 53 is formed also passing through the outside of housing 50. A second hollow air duct 54 is used to connect the first via 18 and the second via 53 so that the air in the exhaust chamber 111 may vent out of the second air duct 54.

Figure 4:
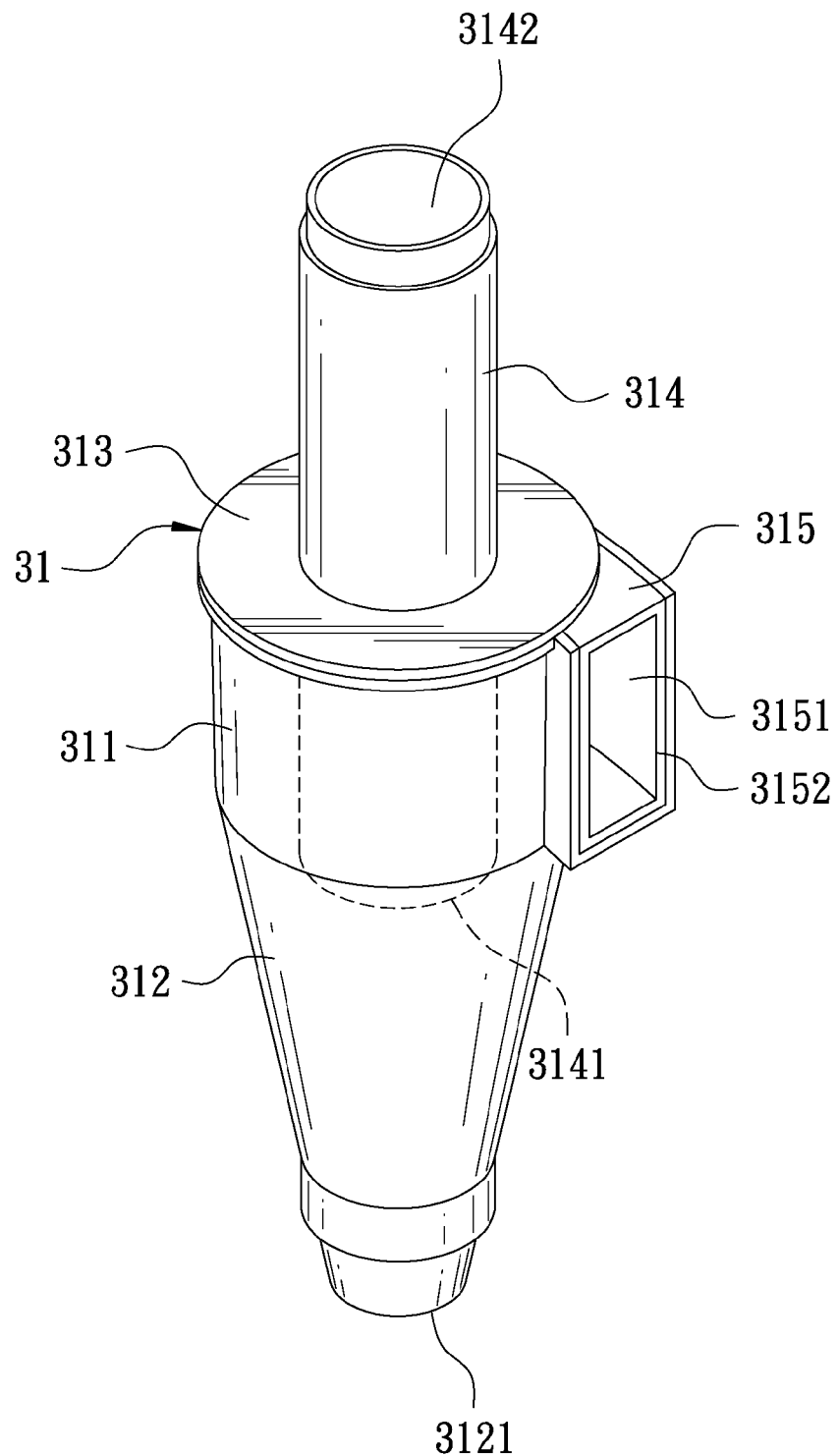
FIG. 4 is a 3D perspective view of part of a centrifugal dust collector according to this invention.

With reference to FIG. 4 matching with FIG. 2, a 3D perspective view of a centrifugal dust collector according to this invention, the filtering unit 30 mainly comprises several centrifugal dust collectors 31 of which the amount is equivalent to that of the first thru holes 121 of first spacer 12. Each of the centrifugal dust collectors 31 is mainly provided with a hollow duct 311. One end of the duct 311 is forward convergent to form a convergent portion 312 of which the end is formed with a mouth 3121; the other end of the duct 311 is covered with a lid 313. A hollow nozzle 314 going axially along the duct 311 is provided passing through the lid 313. The two ends of nozzle 314 are respectively formed into a guidance inlet 3141 and a guidance outlet 3142. The guidance inlet 3141 lies in the convergent portion 312. Besides, one side of the duct 311 is formed with a prolonged portion 315 parallel with its axis. A flowing passage 3151 communicating with the duct 311 is formed in the prolonged portion 315, and a flowing port 3151 is formed at a free end of the prolonged portion 315. Further, the end of convergent portion 312 of the centrifugal dust collector 31 is connected to the first thru hole 121 of first spacer 12. The bitter end of free end of the nozzle 314 is connected to the second thru hole 131 of second spacer 13 that is symmetrical to the first thru hole 121.

Figure 5:
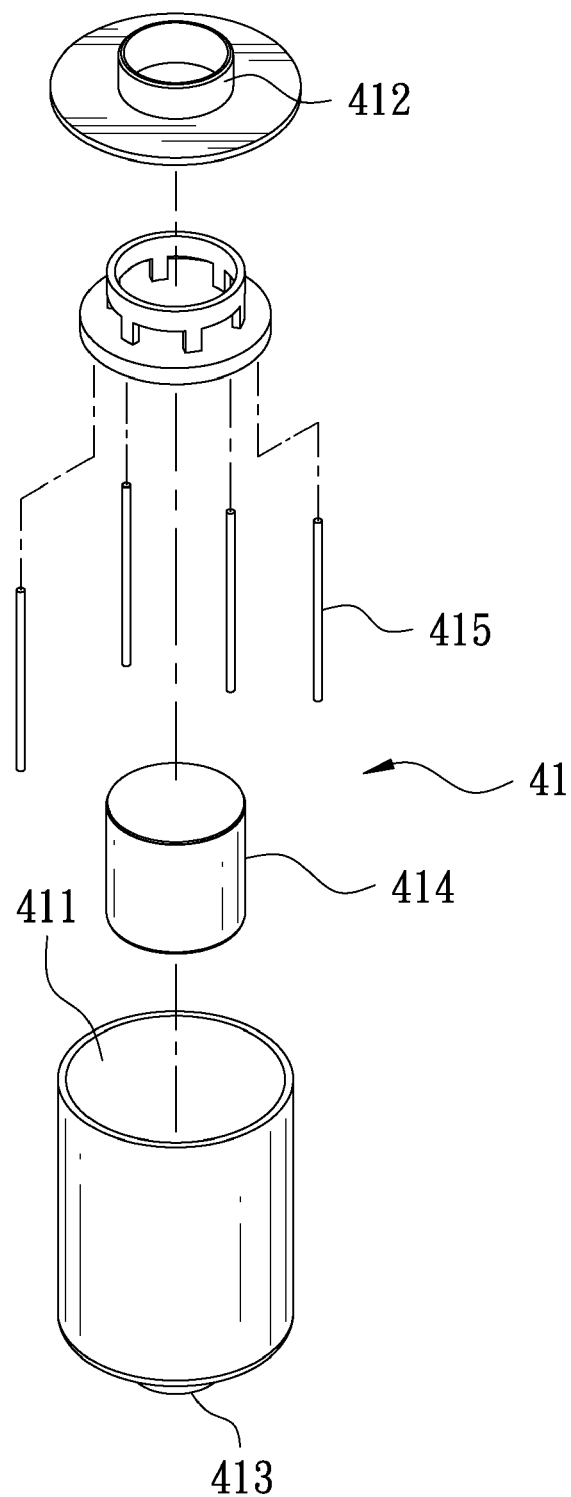
FIG. 5 is a 3D exploded view of a can buoy according to this invention.

With reference to FIG. 5 matching with FIG. 2, a 3D exploded view of a can buoy according to this invention, a can buoy chamber 411 is formed in the can buoy 41. Further, an oil inlet pipe 412 communicating with the can buoy chamber is provided at the outside of the can buoy 41. The free end of oil inlet pipe 412 is connected to the third thru hole 141 of third spacer 14, as shown in FIG. 2. Further, an oil outlet 413 opposite to a side of the oil inlet pipe 412 is formed in the can buoy 41. Next, a buoy 414 of which the diameter is larger than that of oil outlet 413 is provided in the can buoy chamber 411 of can buoy 41. Four position limiting pillars 415 parallel with the central axis of oil outlet 413 is provided around the buoy 414 so that the buoy 414 may be guided by the position limiting pillars 415 to shift up and down along the central axis of oil outlet 413.

Figure 6:
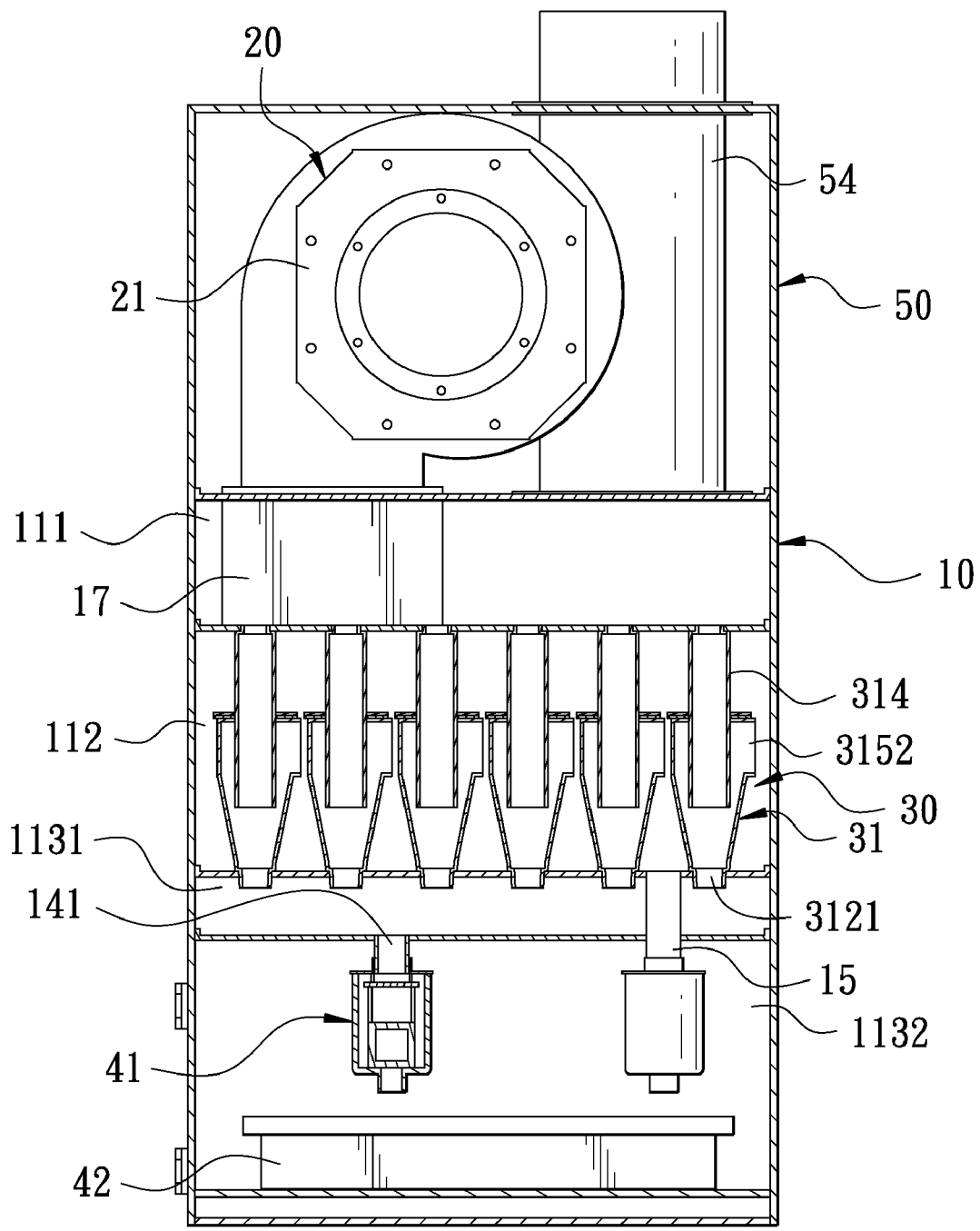
FIG. 6 is a schematic view illustrating the operation of this invention.

With reference to FIG. 6, a schematic view illustrating the operation of an oil mist separator according to this invention, when the air blower 21 is activated, the outside oil mist enters the filter chamber 112 from the first air duct 17. At this time, owing to specific weight, some oil mist of which the mass is heavier deposits in the bottom of filtering chamber 112 and flows into the buoy 41 from the adapter 15, and is collected in an oil catcher 42; the oil mist of which the mass is lighter enters the centrifugal dust collector 31 with the air from the flowing port 3152, and goes spirally forward to the mouth 3121 along the inner wall of duct 311 to form a spiral air stream; with a centrifugal force caused by the spiral air stream; the oil mist of which the mass is lighter is made to separate from the air and is dripped into the separation layer 1131 of the body 10 from the mouth 3121. Then, the air of zero pollution that separates from the oil mist enters the exhaust chamber 111 from the nozzle 314 and, after being gathered in the exhaust chamber 111, is extracted to the outdoors from the second air duct 54. Next, the oil mist entering the separation layer 1131 flows into the can buoy 41 from the third thru holes 141 and, due to the effect of the air block and oil discharge that is caused by the specific weight and pressure differential, is discharged out of the oil outlet 413 and collected in the oil catcher 42 for recycling, no filter net being thereby required and the oil mist even separating from the air. With the oil collection unit, the separated oil mist may be recycled and made into a low-level oil product or a release agent used in the building industry for achievement of the effect of environmental protection.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. An oil mist separator comprises,
a body;
an air intake unit;
a filtering unit;
a container being formed in the body;
a first spacer and a second spacer being formed and piled in an inner layer of the container to form an exhaust chamber;
a filtering chamber;
an oil collection chamber being formed from top to bottom in the container;
a plurality of first thru holes being formed and passing through the first spacer;
a plurality of second thru holes, in a same amount of the plurality of the first thru holes, being symmetrically positioned and passing through the second spacer;
at least one first via communicating with the exhaust chamber and passing through outside of the body;
the air intake unit being an air blower and being provided with at least one air inlet and at least one air outlet communicating with the filtering chamber;
the filtering unit lying in the filtering chamber of the body and comprising a plurality of centrifugal dust collectors;
the amount of the plurality of centrifugal dust collectors being equivalent to the amount of the first thru holes of the first spacer;
each of the plurality of the centrifugal dust collectors being provided with a hollow duct;
one end of each of the hollow duct being forward convergent to form a convergent portion and the end of the convergent portion is formed with a mouth;
another end of the hollow duct being covered with a lid;
a hollow nozzle being positioned axially along the hollow duct and passing through the lid;
the two ends of the hollow nozzle being respectively formed into a guidance inlet and a guidance outlet;
the guidance inlet lying in the convergent portion;
one side of the body being formed with a prolonged portion in parallel with a central axis of the body;
a flowing passage communicating with the hollow duct and being formed in the prolonged portion;

a flowing port being formed at a free end of the prolonged portion;

the end of the convergent portion of the centrifugal dust collector being connected to a first thru hole of the first spacer;

a bitter end of the nozzle being connected to a second thru hole of the second spacer;

the body comprising a housing;

the housing covering a top side of the exhaust chamber to form a container chamber where the air intake unit is contained;

one first thru hole of the plurality of the first thru holes being formed and passing through a surface of the housing and communicating with the air inlet of the air intake unit;

one second thru hole of the plurality of second thru holes communicating with the exhaust chamber and passing through outside of the body and being connected to the air outlet of the air intake unit;

a third thru hole being formed and passing through the second spacer of the body; and a hollow first air duct connecting the one second thru hole and the third thru hole.

2. The oil mist separator according to claim 1, wherein a second via is formed passing through the surface of housing and a second hollow air duct is provided in the container chamber, of which the two ends are respectively connected to a first via of the body and a second via of the housing.

3. The oil mist separator according to claim 1, wherein a third spacer is provided in the oil collection chamber of the body to form a separation layer and an oil collection layer under the separation layer, several thru holes are formed passing through the third spacer, several fourth thru holes symmetrical to the third thru holes are even formed on the first spacer of the body, in which the fourth thru holes are the fewer than the third thru holes, and the fourth thru holes are respectively connected to the opposite third thru holes through the hollow adapters.

4. The oil mist separator according to claim 3, wherein the oil mist separator further comprises an oil collection unit arranged in the oil collection layer of the body, in which the unit mainly comprises can buoys of which the amount is equivalent to that of third thru holes, and at least one oil catcher provided under the can buoys.

5. The oil mist separator according to claim 4, wherein a can buoy chamber is formed in the can buoy, an oil inlet pipe communicating with the can buoy chamber is provided at the outside of the can buoy, the free end of oil inlet pipe is connected to the third thru hole of third spacer, an oil outlet opposite to a side of the oil inlet pipe is formed in the can buoy, a buoy of which the diameter is larger than that of oil outlet is provided in the can buoy chamber of can buoy, and four position limiting pillars parallel with the central axis of oil outlet are provided around the buoy and thus the buoy is guided by the position limiting pillars to shift up and down along the central axis of oil outlet.

* * * * *